US011980839B2

(12) United States Patent
Tanaka (10) Patent No.: US 11,980,839 B2
(45) Date of Patent: May 14, 2024

(54) FILTER ELEMENT (71) Applicant: SMC CORPORATION, Chiyoda-ku (JP)

(72) Inventor: Takayuki Tanaka, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 428 days.

(21) Appl. No.: 17/439,885

(22) PCT Filed: Mar. 20, 2019

(86) PCT No.: PCT/JP2019/011766
§ 371 (c)(1),
(2) Date: Sep. 16, 2021

(87) PCT Pub. No.: WO2020/188800
PCT Pub. Date: Sep. 24, 2020

(65) Prior Publication Data
US 2022/0176297 A1 Jun. 9, 2022

(51) Int. Cl.
B01D 46/24 (2006.01)
B01D 46/52 (2006.01)
B01D 46/64 (2022.01)

(52) U.S. Cl.
CPC ........ B01D 46/2411 (2013.01); B01D 46/521 (2013.01); B01D 46/64 (2022.01)

(58) Field of Classification Search
CPC .. B01D 46/2411; B01D 46/64; B01D 46/521; F16L 37/18
(Continued)

(56) References Cited

U.S. PATENT DOCUMENTS 3,272,336 A * 9/1966 Humbert, Jr. ........ B01D 35/306
210/DIG. 17
5,112,372 A 5/1992 Boeckermann et al.
(Continued)

FOREIGN PATENT DOCUMENTS

CN 104548808 A 4/2015
CN 108993050 A 12/2018
(Continued)

OTHER PUBLICATIONS

International Search Report dated Jun. 11, 2019 in PCT/JP2019/011766 filed on Mar. 20, 2019 (2 pages).

Primary Examiner — Robert A Hopkins
Assistant Examiner — Qianping He
(74) Attorney, Agent, or Firm — Oblon, McClelland, Maier & Neustadt, L.L.P.

(57) ABSTRACT

A filter element has a central channel, an inner core, an inner filter member, an outer core, and an outer filter member. The inner core has vent holes formed around a portion facing the central channel. The outer core has a perforated portion having vent holes formed therearound and a non-perforated portion having no vent hole. The region over which the non-perforated portion is formed along the central channel extends from a position above the central position of the central channel in the up-down direction to the upper end of the central channel. The region over which the perforated portion is formed along the central channel extends from the lower end of the non-perforated portion to the lower end of the central channel.

6 Claims, 9 Drawing Sheets (58) Field of Classification Search
USPC .................................. 55/482; 210/DIG. 17
See application file for complete search history.

(56) References Cited

U.S. PATENT DOCUMENTS

| | | |
|---|---|---|
| 2018/0117517 A1 | 5/2018 | Tanaka |
| 2019/0054410 A1 | 2/2019 | Tanaka |

FOREIGN PATENT DOCUMENTS

| | | | | |
|---|---|---|---|---|
| DE | 10 2006 048 883 A1 | | 4/2008 | |
| GB | 2261830 A | * | 6/1993 | ......... B01D 46/0031 |
| JP | 51-12372 U | | 4/1972 | |
| JP | 60-166020 U | | 11/1985 | |
| JP | 4-330366 A | | 11/1992 | |
| JP | 7-328364 A | | 12/1995 | |
| WO | WO 2016/181820 A1 | | 11/2016 | |
| WO | WO-2016181820 A1 | * | 11/2016 | ......... B01D 46/0005 |
| WO | WO 2017/150027 A1 | | 9/2017 | |
| WO | WO 2018/194060 A1 | | 10/2018 | |

\* cited by examiner

FILTER ELEMENT

TECHNICAL FIELD

The present invention relates to a filter element to be used for a pneumatic filter to remove foreign matter, such as liquid or dust, from compressed air.

BACKGROUND ART

Figure 8:
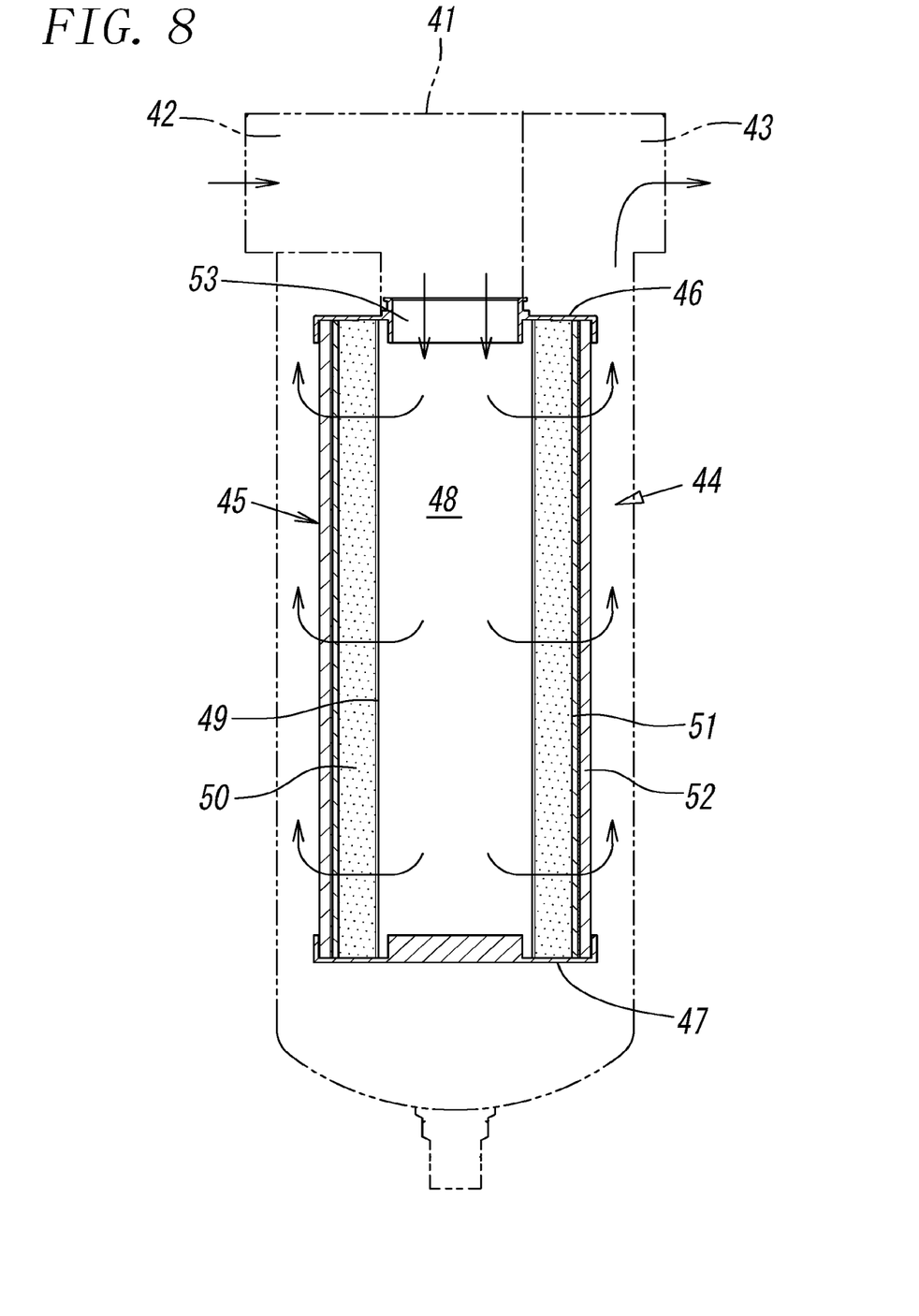
FIG. 8 is a cross-sectional view illustrating a known pneumatic filter.

When a pneumatic actuator such as a pneumatic cylinder or a pneumatic motor is actuated, it is required to use clean compressed air with no dust nor liquid, such as oil or water, being mixed therein. In order to remove foreign matter such as liquid or dust from the compressed air, a pneumatic filter is normally disposed in a pneumatic circuit for supplying compressed air to the pneumatic actuator. An example of such a pneumatic filter is disclosed in Patent Literature (PTL) 1. As illustrated in FIG. 8, this type of pneumatic filter normally includes a hollow filter element 44 for removing foreign matter. The filter element 44 is disposed inside a filter case 41 that has an inlet port 42 and an outlet port 43.

The filter element 44 includes a filter body 45 shaped like a hollow cylinder, an upper cap 46 attached to the upper end of the filter body 45, and a lower cap 47 attached to the lower end of the filter body 45.

The filter body 45 includes an inner core 49, an inner filter member 50, an outer core 51, and an outer filter member 52. The inner core 49 is shaped like a hollow cylinder that defines a central space 48. The inner filter member 50 surrounds the periphery of the inner core 49. The outer core 51 is shaped like a hollow cylinder and surrounds the periphery of the inner filter member 50. The outer filter member 52 surrounds the periphery of the outer core 51.

The inner core 49 and the outer core 51 are made of perforated metal sheets, and vent holes are disposed uniformly over the entire core.

In the pneumatic filter, compressed air is introduced from the inlet port 42 of the filter case 41 through an air introduction port 53 of the upper cap 46 into the central space 48 of the filter body 45. As indicated by arrows in FIGS. 8 and 9, the compressed air subsequently enters the inner filter member 50 through vent holes 49a of the inner core 49, passes through the inner filter member 50, and enters the outer filter member 52 through vent holes 51a of the outer core 51. After passing through the outer filter member 52, the compressed air flows out of the filter element 44 toward the outlet port 43 of the filter case 41. In this process, liquid such as oil and water contained in the compressed air is collected in the inner filter member 50 and the outer filter member 52. The liquid is gradually aggregated into large droplets, and the liquid droplets move down by their own weight and drip into the filter case 41.

Figure 9:
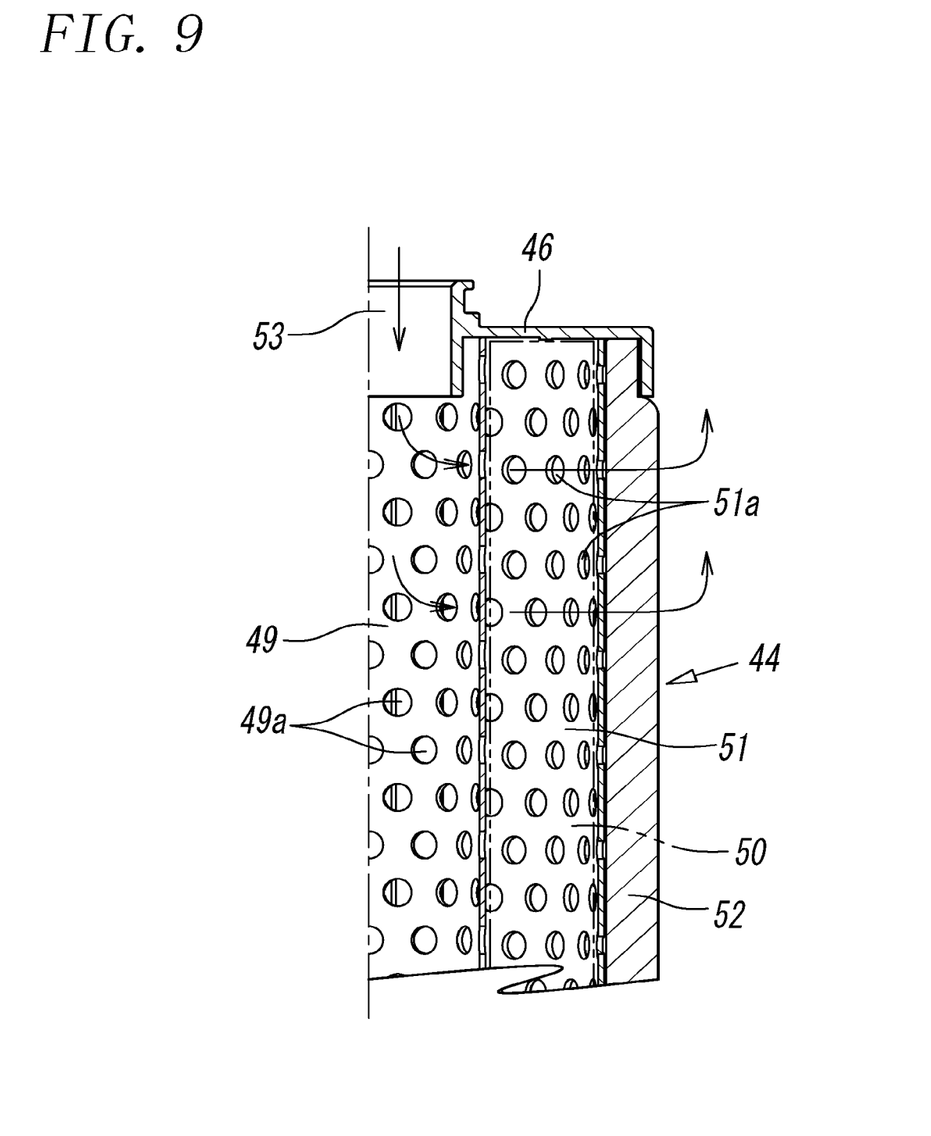
FIG. 9 is a partially enlarged view of the pneumatic filter of FIG. 8.

In the filter element 44, the compressed air that is introduced into the central space 48 from the air introduction port 53 of the upper cap 46 normally takes the shortest route to flow through the filter body 45 from the central space 48 toward the outside of the filter element 44. More specifically, the vent holes 49a and vent holes 51a are formed uniformly over respective entire surfaces of the inner core 49 and the outer core 51. Accordingly, the compressed air introduced into the central space 48 flows out so as to horizontally transverse the vent holes 49a of the inner core 49, the inner filter member 50, the vent holes 51a of the outer core 51, and the outer filter member 52. As a result, liquid droplets once collected in the inner filter member 50 and the outer filter member 52 tend to move laterally with the flow of the compressed air and disperse again from the outer filter member 52 into the compressed air, which leads to a problem that the compressed air mixed with the liquid droplets flows out of the outer filter member 52. Liquid droplets tend to redisperse more especially at an upper part (near the inlet) of the central space 48 because the air pressure is higher as the distance from the inlet is smaller.

CITATION LIST

Patent Literature

PTL 1: Japanese Unexamined Utility Model Registration Application Publication No. 60-166020

SUMMARY OF INVENTION

Technical Problem

A technical problem is to prevent aggregated liquid droplets from redispersing into compressed air by controlling the flow of compressed air flowing through the filter element.

Solution to Problem

To solve the above-described technical problem, a filter element according to an aspect of the present invention includes a filter body shaped like a hollow cylinder, an upper cap attached to an upper end of the filter body, and a lower cap attached to a lower end of the filter body.

The filter body has a central space formed so as to extend inside the filter body along a central axis of the filter body. The filter body includes an inner core that is shaped like a hollow cylinder so as to define the central space, an inner filter member that surrounds a periphery of the inner core, an outer core that is shaped like a hollow cylinder and surrounds a periphery of the inner filter member, and an outer filter member that surrounds a periphery of the outer core.

The upper cap has a nozzle that is fitted into an upper part of the central space and configured to introduce compressed air into the central space. The upper cap also has a skirt that is shaped tubularly and surrounds a periphery of the outer filter member. The lower cap has a plug portion that plugs a lower end of the central space and a discharge hole through which drainage separated from the compressed air is discharged. A central channel is formed in the central space between a lower end of the nozzle of the upper cap and an upper end of the plug portion of the lower cap.

In addition, vent holes are formed around a portion of the inner core that faces the central channel. The outer core has a perforated portion around which vent holes are formed and a non-perforated portion in which no vent hole is formed. A region over which the non-perforated portion is formed along the central channel extends from a position above a central position of the central channel in an up-down direction to an upper end of the central channel. A region over which the perforated portion is formed along the central channel extends from a lower end of the non-perforated portion to a lower end of the central channel.

In the filter element, an upper portion of the inner filter member may be disposed between the inner core having the vent holes and the non-perforated portion of the outer core at an upper part of the central channel. In addition, a downflow channel in which the compressed air flowing in between the inner core and the outer core from the central channel through the vent holes of the inner core flows downward along the inner filter member is thereby formed between the inner core and the non-perforated portion of the outer core.

In the filter element, the non-perforated portion of the outer core may extend to a position below a lower end of the skirt of the upper cap.

In the up-down direction, a ratio of a length of the non-perforated portion formed in the outer core to a length of the central channel may be 10 to 35%, and more preferably 15 to 30%.

In the filter element, the upper cap preferably has an air inlet being in communication with the nozzle. An inside diameter of the air inlet is preferably larger than any of inside diameters of the nozzle and the central channel. In addition, the inside diameter of the nozzle is preferably smaller than the inside diameter of the central channel.

Advantageous Effects of Invention

According to the present invention, the non-perforated portion having no vent hole is formed at the upper portion of the outer core so as to surround the upper part of the central channel, which enables the non-perforated portion to control the flow direction of compressed air passing through the filter element. This prevents the flow of compressed air from redispersing aggregated liquid droplets into the compressed air at the upper part of the central channel where the compressed air flows at a high velocity.

DESCRIPTION OF EMBODIMENTS

FIGS. 1 to 7 illustrate an embodiment of a filter element 1 according to the present invention. The filter element 1 includes a filter body 2, an upper cap 3, and a lower cap 4. The filter body 2 is shaped like a hollow cylinder. The upper cap 3 is shaped circularly and attached to an upper end of the filter body 2, which is an end along the central axis L of the filter body 2. The lower cap 4 is shaped circularly and attached to a lower end of the filter body 2, which is an end opposite to the upper end.

The filter body 2 has a central space 5 formed therein so as to extend in the up-down direction along the central axis L. The filter body 2 also has an inner core 6, an inner filter member 7, an outer core 8, and an outer filter member 9. The inner core 6 is a perforated hollow cylinder that defines the central space 5. The inner filter member 7 is a hollow member that surrounds the periphery of the inner core 6. The outer core 8 is a perforated hollow cylinder that surrounds the periphery of the inner filter member 7. The outer filter member 9 is a hollow member that surrounds the periphery of the outer core 8. Note that the terms "central axis direction" and "up-down direction" are used herein to have substantially the same meaning.

The inner filter member 7 is positioned upstream of the outer filter member 9 in the flow of compressed air and mainly collects dust and liquid contained in the compressed air. The liquid is in the form of mist or droplets and is made of oil, water, or the like. The inner filter member 7 is formed by cylindrically curling a pleated filter sheet. The inner filter member 7 is disposed between the inner core 6 and the outer core 8 such that fold lines 7a are aligned in parallel to the central axis L.

The inner filter member 7 having a pleated structure has a large filtration area compared with a cylindrically curled flat filter sheet.

The inner filter member 7 collects the liquid such as oil and water. The outer filter member 9 is positioned downstream of the inner filter member 7 in the flow of compressed air and mainly serves to take the liquid away from the compressed air flow and to guide the liquid toward the lower cap 4. The outer filter member 9 is disposed at the periphery of the outer core 8 so as to surround the inner filter member 7 with the outer core 8 interposed therebetween. Accordingly, the outer filter member 9 may be referred to as a separation layer that separates the liquid from the compressed air.

For example, the inner filter member 7 and the outer filter member 9 may be formed of a fiber sheet made by regularly or randomly laminating thin chemical fibers each having a diameter of several to several tens of micrometers or of a nonwoven fabric made by bonding the laminated chemical fibers by using an adhesive or by fusing or interlacing. Alternatively, the inner filter member 7 and the outer filter member 9 may be formed of an aggregate of micro ceramic particles or of a porous sheet made of a synthetic resin. The inner filter member 7 is woven densely by using a fiber thinner than that of the outer filter member 9 so as to have a lower porosity (i.e., finely woven) so that the inner filter member 7 can reliably collect minute dust particles and fine mist of oil, water, and the like. In contrast, the outer filter member 9 has a higher porosity (i.e., coarsely woven) by using a fiber thicker than that of the inner filter member 7 so that the outer filter member 9 can send the liquid such as oil or water collected by the inner filter member 7 rapidly toward the lower cap 4. In short, the inner filter member 7 is a fine filter, whereas the outer filter member 9 is a coarse filter.

The upper cap 3 includes an annular cover 12 that covers the upper end of the filter body 2 except for the central space 5. The upper cap 3 also includes a ring-like flange 13 that surrounds the periphery of the cover 12. The flange 13 and the cover 12 are connected by racially disposed multiple links 14.

A cylindrically shaped air inlet 15 into which compressed air flows and a cylindrically shaped nozzle 16 communicating with the air inlet 15 are formed concentrically at the center of the cover 12 so as to extend along the central axis L. The air inlet 15 protrudes upward relative to the cover 12. The nozzle 16 protrudes downward relative to the cover 12 and is fitted in an upper part of the central space 5 of the filter body 2.

The inside diameter of the air inlet 15 is constant over the entire length thereof. The inside diameter of the nozzle 16 is also constant over the entire length thereof. The inside diameter of the air inlet 15 is set to be larger than any of the inside diameter of the nozzle 16 and the diameter of the central space 5. In the illustrated example, the inside diameter of the air inlet 15 is set to be twice as large as the inside diameter of the nozzle 16. An inclined step 17 having a conical surface is formed where the air inlet 15 is joined to the nozzle 16. In addition, the inside diameter of the nozzle 16 is smaller than the diameter of the central space 5.

A cylindrically shaped skirt 18 is formed around the periphery of the cover 12 so as to extend downward and surround the periphery of an upper end portion of the outer filter member 9. The lower end 18a of the skirt 18 is disposed at the same position as the lower end 16a of the nozzle 16 in the up-down direction. The lower end 18a of the skirt 18, however, may come to a position lower than the lower end 16a of the nozzle 16.

The lower cap 4, which plugs the lower end of the filter body 2, has a plug portion 20, a recessed groove 21, and a peripheral wall 22. The plug portion 20 is shaped like a cylindrical stub and is fitted in a lower part of the central space 5 so as to plug the lower part. The recessed groove 21 is formed annularly so as to surround the plug portion 20. The peripheral wall 22 is disposed so as to surround a lower end portion of the outer filter member 9. Lower end portions of the inner core 6, the inner filter member 7, the outer core 8, and the outer filter member 9 are fitted in the recessed groove 21.

An annular support step 23 is formed at the inside surface of the peripheral wall 22 at a position closer to, but lower than, an upper end 22a of the peripheral wall 22. The lower end of the outer filter member 9 abuts the support step 23. The surface of the support step 23 is disposed at the same position as the upper end 20a of the plug portion 20 in the up-down direction. Accordingly, the upper end 22a of the peripheral wall 22 is positioned higher than the upper end 20a of the plug portion 20. The lower end of the outer filter member 9 is positioned higher than the lower ends of the inner core 6, the inner filter member 7, and the outer core 8.

Multiple discharge holes 24 are formed inside the peripheral wall 22 so as to penetrate from the surface of the support step 23 to the lower surface 22b of the peripheral wall 22. The discharge holes 24 are disposed radially around the central axis L. The liquid droplets (drainage) flowing down through the outer filter member 9 and the drainage filtrated by the inner filter member 7 and accumulated in the recessed groove 21 are discharged to the outside of the filter element 1 through the discharge holes 24.

The upper cap 3 and the lower cap 4 are attached to respective upper and lower ends of the filter body 2 as described above. Accordingly, a central channel 10 into which compressed air is introduced is formed in the central space 5 between the lower end 16a of the nozzle 16 of the upper cap 3 and the upper end 20a of the plug portion 20 of the lower cap 4.

The inner core 6 and the outer core 8 are formed by cylindrically curling perforated metal sheets through which many vent holes 25 and 26 are punched out. The inner core 6 and the outer core 8 serve to reinforce the filter body 2.

The vent holes 25 are disposed uniformly around a portion of the inner core 6 that faces the central channel 10.

On the other hand, the outer core 8 has a perforated portion 8b around which the vent holes 26 are disposed uniformly and a non-perforated portion 8a that does not have any vent hole.

Figure 6:
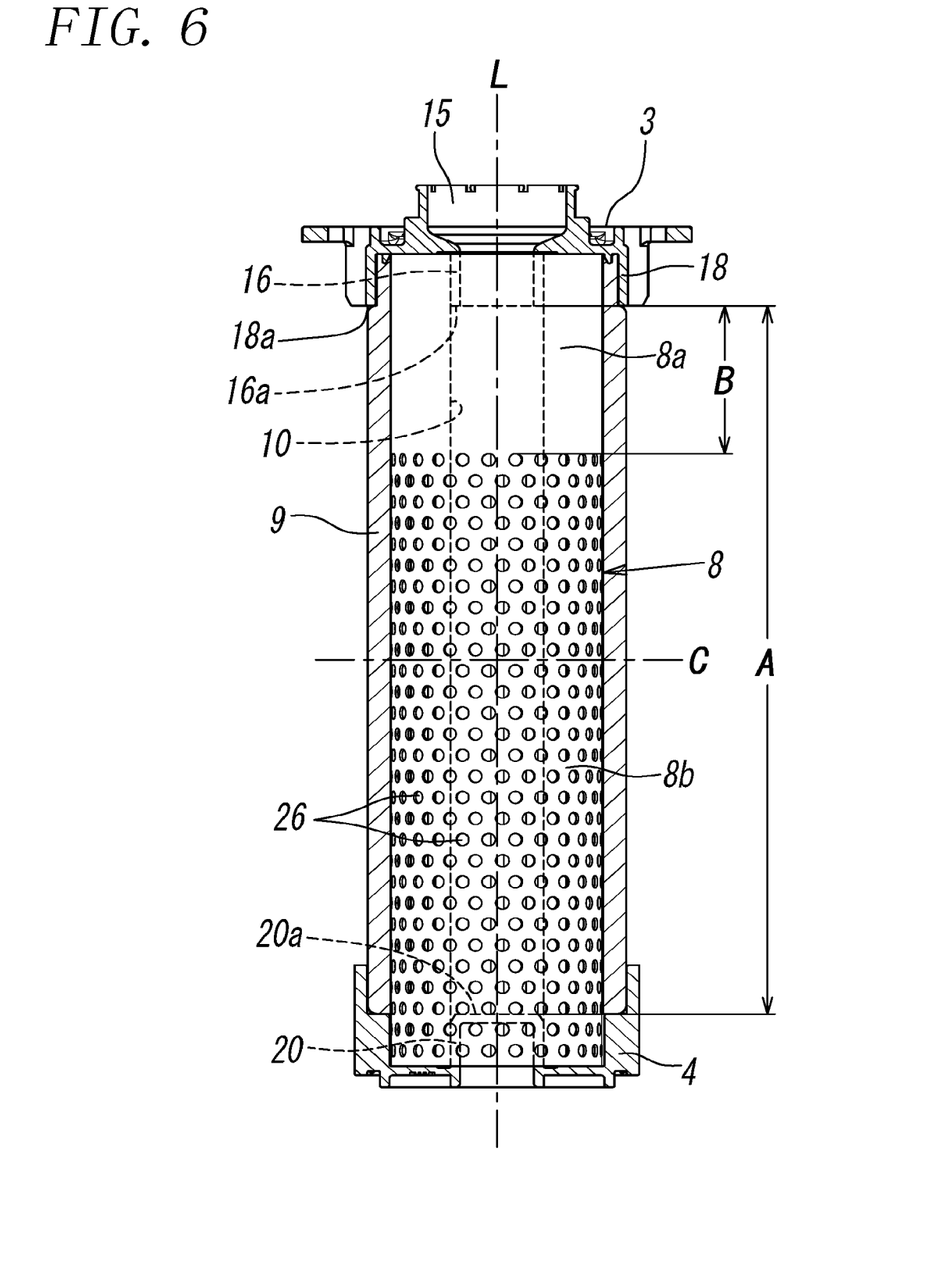
FIG. 6 is a cross-sectional view of the filter element in which an outer filter member, an upper cap, and a lower cap are removed partially.

As illustrated in FIG. 6, the region over which the non-perforated portion 8a is formed in the length direction of the central channel 10 (in the up-down direction) extends from a position above the central position C of the length A of the central channel 10 to the upper end of the central channel 10 (i.e., the lower end 16a of the nozzle 16). The non-perforated portion 8a is also configured to extend to a position below the lower end 18a of the skirt 18.

On the other hand, the region over which the perforated portion 8b is formed in the length direction of the central channel 10 extends from the lower end of the non-perforated portion 8a to the lower end of the central channel 10 (i.e., the upper end 20a of the plug portion 20).

Accordingly, an upper portion of the inner filter member 7 is disposed between the inner core 6 having the vent holes 25 and the non-perforated portion 8a of the outer core 8 at an upper part of the central channel 10, and the inside surface of an upper portion of the outer filter member 9 is covered by the non-perforated portion 8a of the outer core 8.

Note that the diameter of each vent hole 25 formed in the inner core 6 is equal to that of each vent hole 26 formed in the outer core 8. The density of the vent holes 25 formed in the inner core 6 is also equal to the density of the vent holes 26 formed in the outer core 8.

Figure 1:
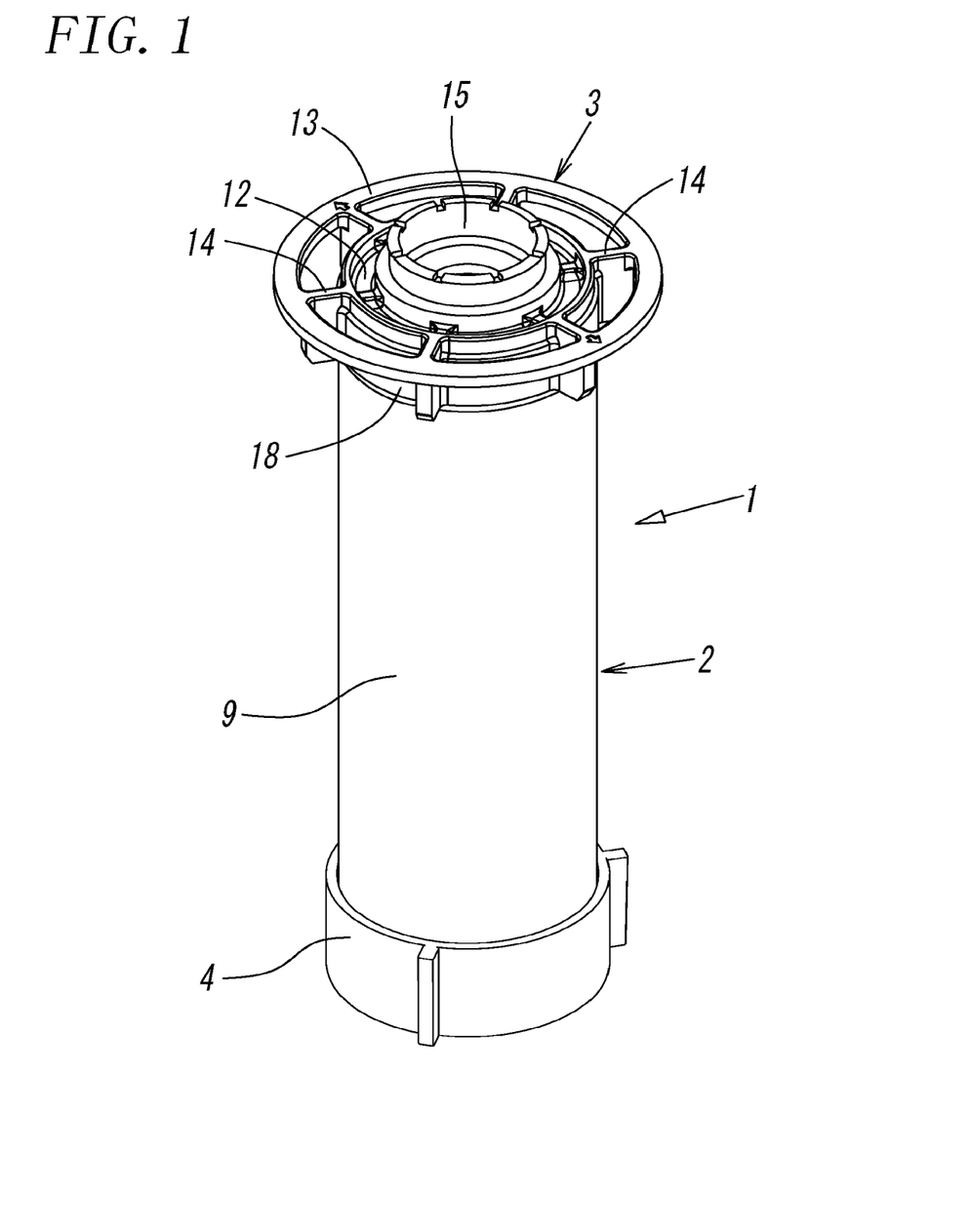
FIG. 1 is a perspective view illustrating an embodiment of a filter element according to the present invention.
Figure 2:
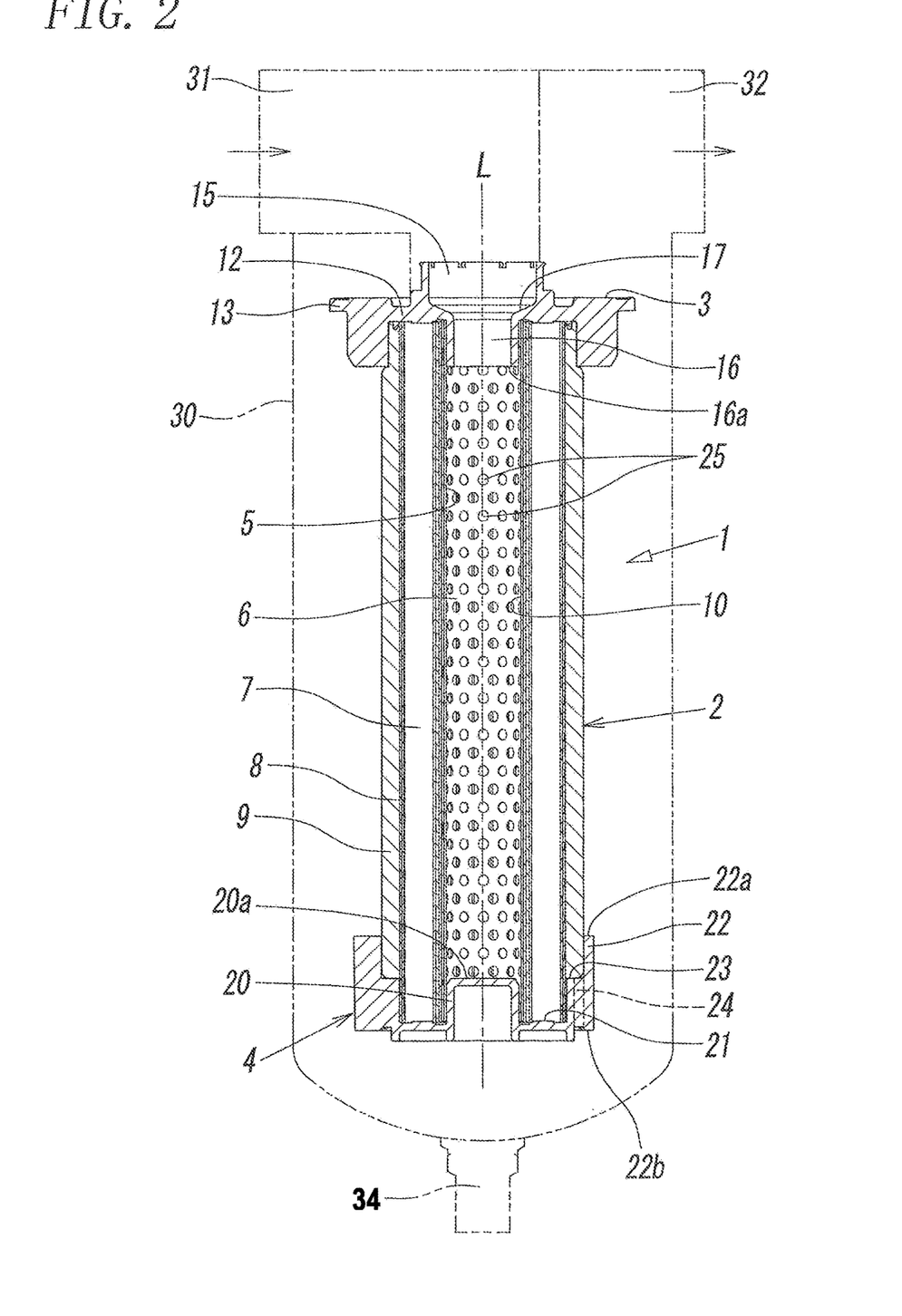
FIG. 2 is a cross section of the filter element of FIG. 1 taken along the central axis thereof.
Figure 3:
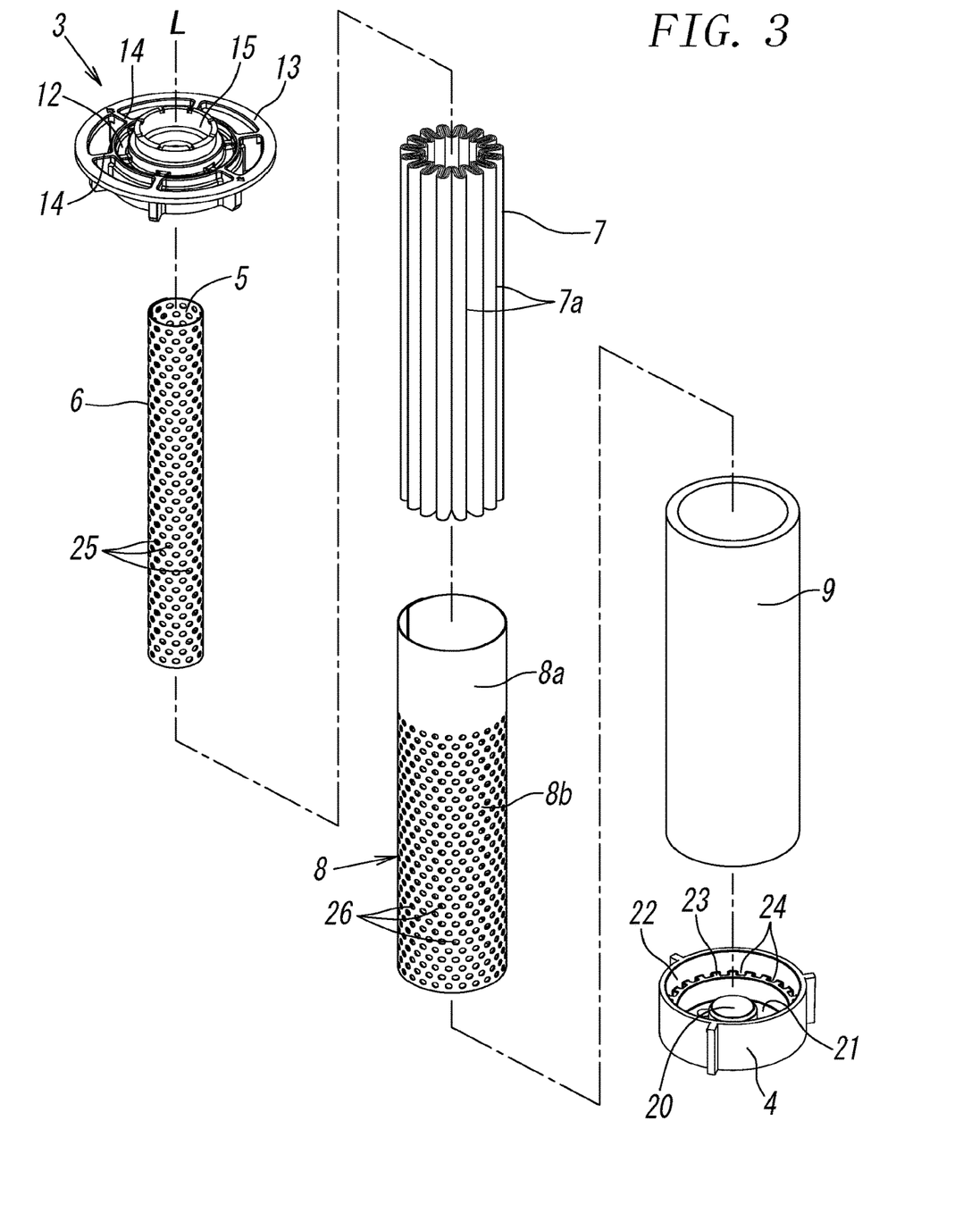
FIG. 3 is an exploded view illustrating the filter element of FIG. 1.
Figure 4:
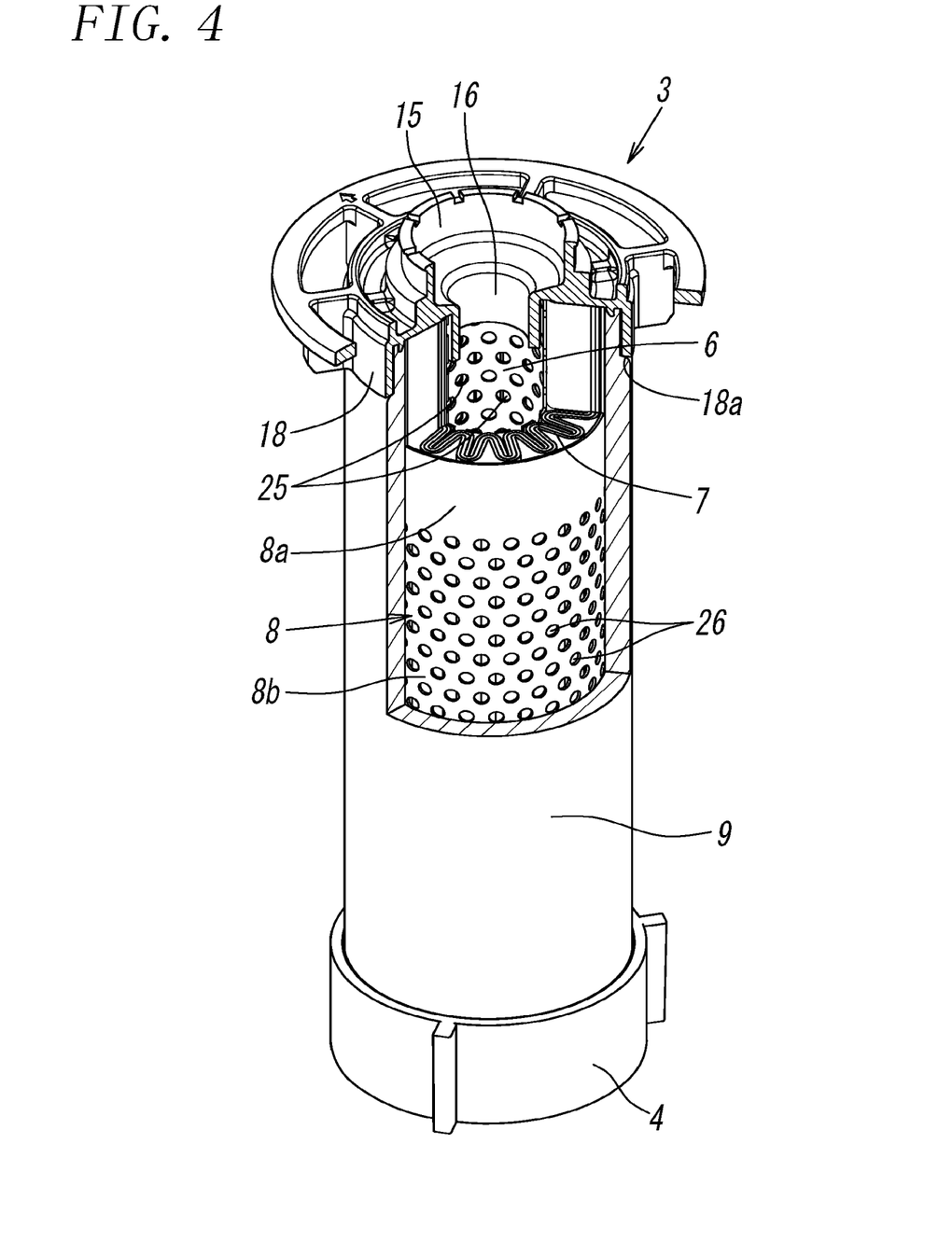
FIG. 4 is a partially broken perspective view illustrating a portion of the filter element of FIG. 1.
Figure 5:
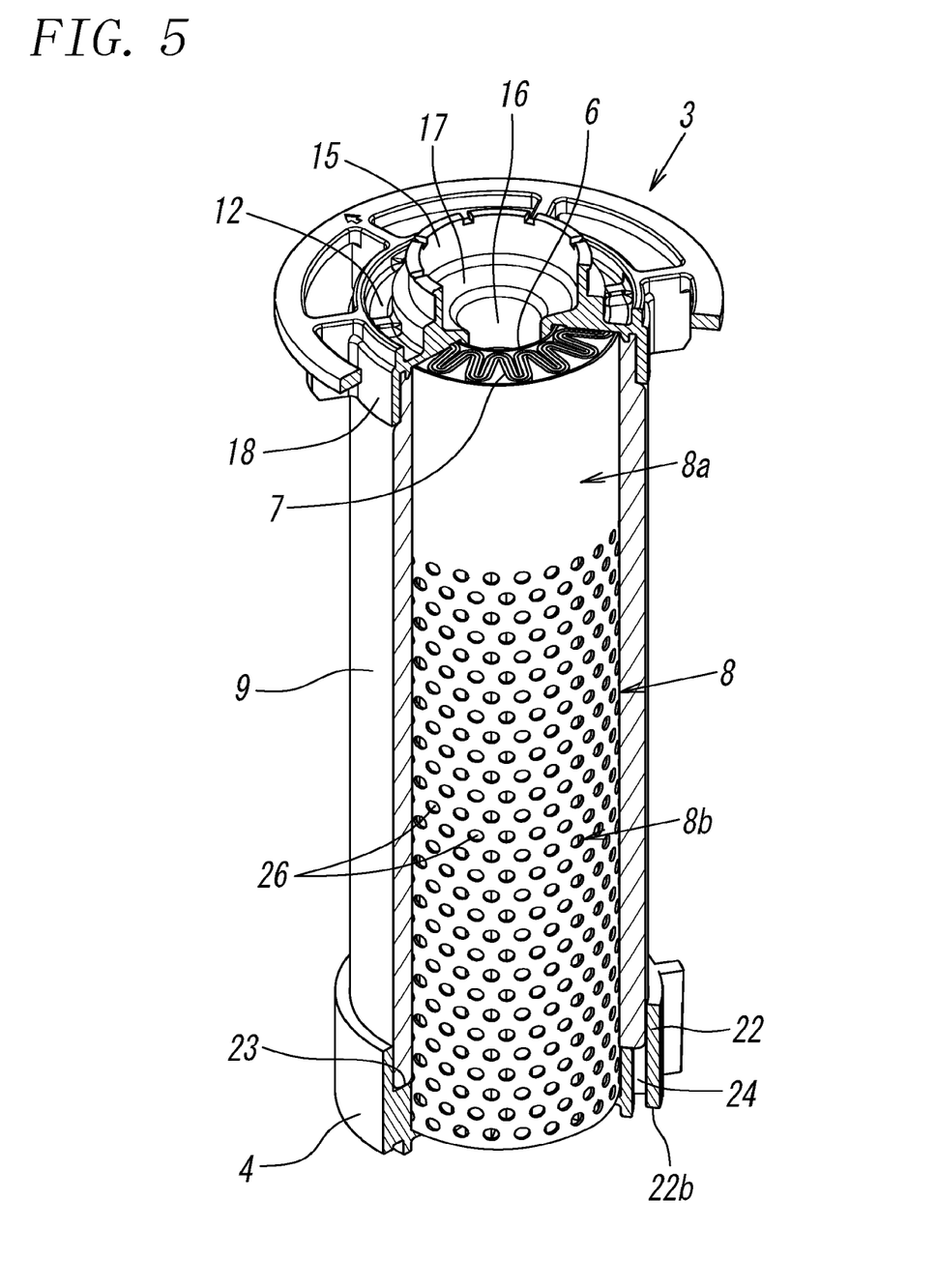
FIG. 5 is a partially broken perspective view illustrating another portion of the filter element of FIG. 1.

The filter element 1 with the above-described configuration is accommodated inside a filter case 30 as indicated by the chain lines in FIG. 2. The filter case 30 has an inlet port 31 into which uncleaned compressed air flows and an outlet port 32 from which cleaned compressed air flows out. The compressed air from the inlet port 31 is introduced into the central channel 10 through the air inlet 15 and the nozzle 16 of the upper cap 3. The compressed air subsequently passes successively through the vent holes 25 of the inner core 6, the inner filter member 7, the vent holes 26 of the outer core 8, and the outer filter member 9. In this process, the inner filter member 7 and the outer filter member 9 remove dust and liquid such as oil, water, and the like, from the compressed air. Consequently, the compressed air flows out through the outlet port 32 of the filter case 30 and is supplied to a fluid-pressure apparatus (not illustrated).

The liquid collected by the inner filter member 7 is initially in the form of minute particles, which are gradually aggregated into large particles. Due to gravity, the large particles move down through the inner filter member 7 and also through the outer filter member 9. Meanwhile, the particles are further combined into even larger liquid particles, which finally reaches the lower cap 4. After the liquid flowing down the inner filter member 7 reaches the recessed groove 21 of the lower cap 4, the liquid flows over the support step 23 into the discharge holes 24 and drips into the filter case 30. Meanwhile, the liquid flowing down the outer filter member 9 reaches the support step 23, and the liquid further flows through the discharge holes 24 and drips into the filter case 30. The drainage accumulated in the filter case 30 flows out appropriately through a discharge hole 34.

Figure 7:
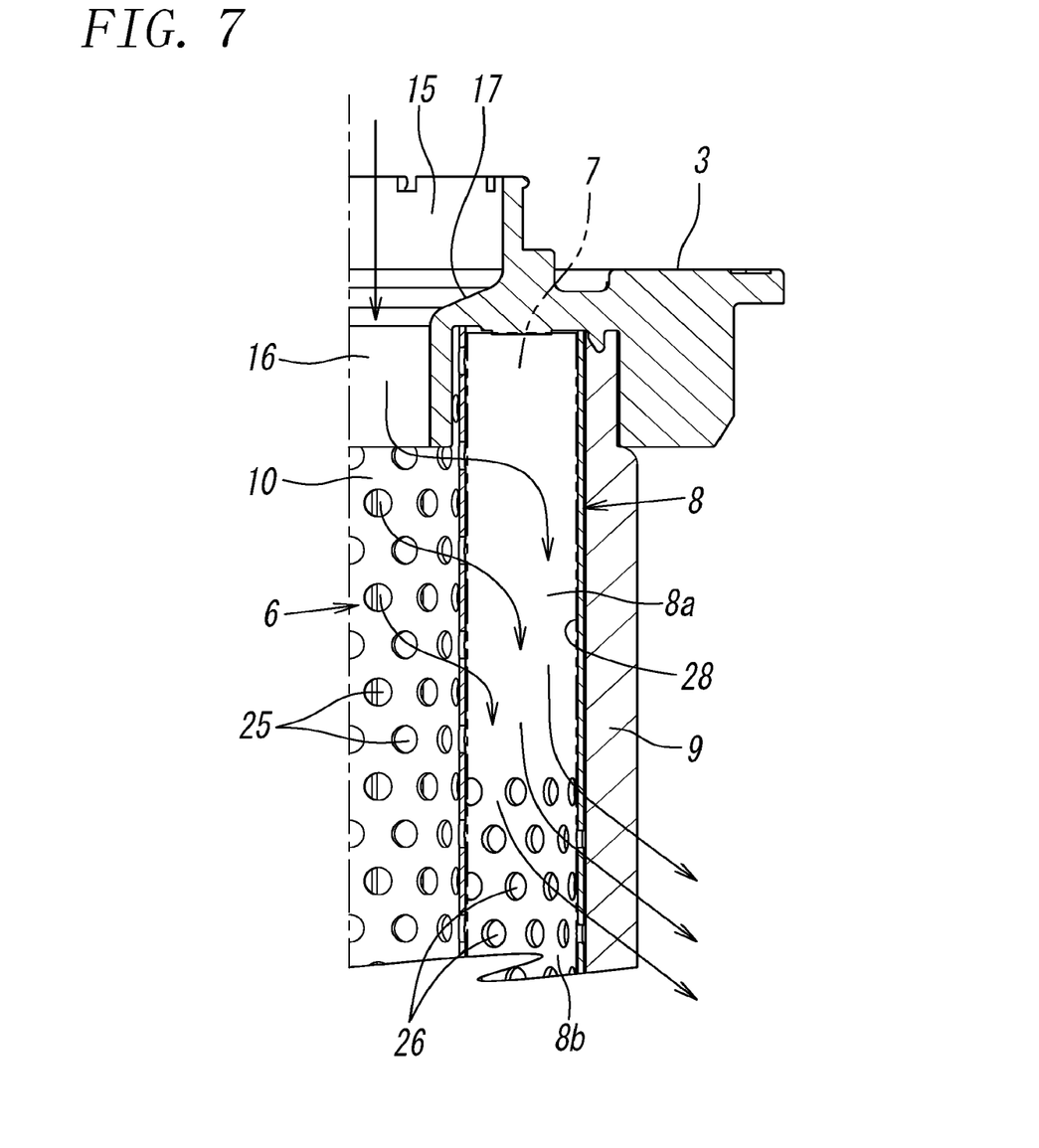
FIG. 7 is a partially enlarged view of the filter element of FIG. 2 in which the outer filter member is omitted.

Here, the flow of the compressed air will be described in detail with reference to FIG. 7. In FIG. 7, the inner filter member 7 is omitted to show the arrangement of the vent holes 26 of the outer core 8 clearly. The inner filter member 7 is indicated by the chain line.

In FIG. 7, compressed air enters the small-diameter nozzle 16 from the large-diameter air inlet 15, which squeezes the flow and thereby increases the velocity of flow. The compressed air is introduced, in a diffusion state (in a turbulent state), from the nozzle 16 into the central channel 10 having a diameter larger than that of the nozzle 16.

The compressed air introduced into the central channel 10 tends to take the shortest route to flow through the filter body 2 from the central channel 10 toward the outside of the outer filter member 9. Here, the pressure of air is higher in an upper part of the central channel 10 (near the inlet) than in a lower part thereof. Accordingly, the velocity of the compressed air normally becomes higher in the upper part.

The upper portion of the outer core 8 is the non-perforated portion 8a. Accordingly, the compressed air that has flown into the inner filter member 7 through the vent holes 25 of the inner core 6 is blocked by the non-perforated portion 8a at the upper part of the central channel 10 and prevented from flowing laterally (horizontally) through the outer core 8. The compressed air is thereby caused to flow downward along the non-perforated portion 8a. A portion of the compressed air flows straight down along the inner filter member 7, and a remaining portion of the compressed air flows obliquely downward. Accordingly, the liquid collected by the inner filter member 7 is moved rapidly downward due to gravity and due to the downward flow of the compressed air.

When the downward flow of the compressed air reaches the perforated portion 8b of the outer core 8, the compressed air passes through the vent holes 26 of the outer core 8 and flows obliquely downward through the outer filter member 9. Consequently, the compressed air flows out of the filter element 1 and finally flows out through the outlet port 32 of the filter case 30. Here, the aggregated liquid particles are subjected to an obliquely downward force by the compressed air in the outer filter member 9. The liquid particles are moved rapidly downward through the outer filter member 9 due to the downward force and gravity and separated from the compressed air flow, thereby preventing the liquid from redispersing into the compressed air.

Put another way, a downflow channel 28 is formed between the inner core 6 and the non-perforated portion 8a of the outer core 8. In the downflow channel 28, the compressed air coming from the central channel 10 through the vent holes 25 of the inner core 6 flows downward along the inner filter member 7.

Drainage particles, such as dust, that have large inertia in the compressed air are transported to a deeper or lower position in the central space 5 due to a high velocity flow of the compressed air at the nozzle 16 and collected mainly by lower portions of the inner filter member 7 and the outer filter member 9. Accordingly, the drainage particles are prevented from redispersing into the compressed air flow compared with a case in which the drainage particles are collected by upper portions of the inner filter member 7 and the outer filter member 9 and moved down along these filter members.

According to experiments performed by the inventors, it was observed to be quite effective in preventing aggregated liquid droplets from dispersing again when the ratio of the non-perforated portion 8a, in other words, the ratio of the length B of the non-perforated portion 8a to the length A of the central channel 10 along the central axis L as in FIG. 6, was in the range of 10 to 35%, and more preferably in the range of 15 to 30%.

When the ratio of the non-perforated portion 8a was 10% or smaller, it was observed not to be ineffective in prevention of redispersing but the degree of effectiveness was small. The smaller the ratio, the more the liquid droplets collected by the inner filter member 7 and the outer filter member 9 were dispersed again from the outer filter member 9 into the compressed air.

When the ratio of the non-perforated portion 8a is 35% or larger, the region of the perforated portion 8b or the ratio of the opening area of the outer core 8 becomes too small, which increases the air pressure in the central channel 10, and also at the perforated portion 8b, due to less vent holes 26 narrowing the flow path. As a result, the velocity of the compressed air passing through the vent holes 26 of the outer core 8 increases. This increases the likelihood of the liquid droplets collected by the inner filter member 7 and the outer filter member 9 dispersing again into the high velocity air flow. Especially when the ratio of the non-perforated portion 8a exceeded 50%, it was found that the prevention of redispersion of the liquid droplets was hardly effective.

REFERENCE SIGNS LIST

1 filter element
2 filter body
3 upper cap
4 lower cap
5 central space
6 inner core
7 inner filter member
8 outer core
8*a* non-perforated portion
8*b* perforated portion
9 outer filter member
10 central channel
15 air inlet
16 nozzle
16*a* lower end
20 plug portion
20*a* upper end
24 discharge hole
25, 26 vent hole
28 downflow channel
A length of central channel
B length of non-perforated portion
C central position
L central axis

The invention claimed is:

1. A filter element comprising:
a filter body shaped like a hollow cylinder;
an upper cap attached to an upper end of the filter body; and
a lower cap attached to a lower end of the filter body, wherein
the filter body includes
a central space formed so as to extend inside the filter body along a central axis of the filter body,
an inner core that is shaped like a hollow cylinder so as to define the central space,
an inner filter member that surrounds a periphery of the inner core,
an outer core that is shaped like a hollow cylinder and surrounds a periphery of the inner filter member, and
an outer filter member that surrounds a periphery of the outer core, the upper cap includes
a nozzle that is fitted into an upper part of the central space and configured to introduce compressed air into the central space, and
a skirt that is shaped tubularly and surrounds a periphery of the outer filter member,
the lower cap includes a plug portion that plugs a lower end of the central space,
a central channel is formed in the central space between a lower end of the nozzle of the upper cap and an upper end of the plug portion of the lower cap, vent holes are formed around a portion of the inner core that faces the central channel, the outer core includes a perforated portion around which vent holes are formed and a non-perforated portion in which no vent hole is formed, a region over which the non-perforated portion is formed along the central channel extends from a position above a central position of the central channel in an up-down direction to an upper end of the central channel, and a region over which the perforated portion is formed along the central channel extends from a lower end of the non-perforated portion to a lower end of the central channel.

2. The filter element according to claim 1, wherein an upper portion of the inner filter member is disposed between the inner core having the vent holes and the non-perforated portion of the outer core at an upper part of the central channel, and a downflow channel in which the compressed air flowing in between the inner core and the outer core from the central channel through the vent holes of the inner core flows downward along the inner filter member is thereby formed between the inner core and the non-perforated portion of the outer core.

3. The filter element according to claim 1, wherein the non-perforated portion of the outer core extends to a position below a lower end of the skirt of the upper cap.

4. The filter element according to claim 1, wherein in the up-down direction, a ratio of a length of the non-perforated portion formed in the outer core to a length of the central channel is 10 to 35%.

5. The filter element according to claim 4, wherein in the up-down direction, the ratio of the length of the non-perforated portion formed in the outer core to the length of the central channel is 15 to 30%.

6. The filter element according to claim 1, wherein the upper cap includes an air inlet being in communication with the nozzle, an inside diameter of the air inlet is larger than any of inside diameters of the nozzle and the central channel, and the inside diameter of the nozzle is smaller than the inside diameter of the central channel.

* * * * *